United States Patent
Alvarez et al.

(10) Patent No.: US 7,775,352 B2
(45) Date of Patent: Aug. 17, 2010

(54) SPINDLE PACKAGING

(75) Inventors: Andy Alvarez, Torrance, CA (US);
Thomas Dohner, Covina, CA (US);
Marc Rashba, Oak Park, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 0 days.

(21) Appl. No.: 12/473,162

(22) Filed: May 27, 2009

(65) Prior Publication Data

US 2009/0314670 A1    Dec. 24, 2009

Related U.S. Application Data

(60) Provisional application No. 61/056,345, filed on May 27, 2008.

(51) Int. Cl.
*B65D 85/57* (2006.01)
(52) U.S. Cl. .................. 206/310; 206/445; 206/564
(58) Field of Classification Search ............ 206/308.1, 206/309, 310, 311, 312, 313, 445, 493, 499, 206/564, 565, 485
See application file for complete search history.

(56) References Cited

U.S. PATENT DOCUMENTS

| | | | | |
|---|---|---|---|---|
| 3,107,783 | A * | 10/1963 | Corey et al. | 206/310 |
| 4,278,258 | A | 7/1981 | Fujita et al. | |
| 5,522,501 | A * | 6/1996 | Luckow | 206/308.1 |
| 5,769,217 | A * | 6/1998 | Derraugh et al. | 206/308.1 |
| 6,119,872 | A | 9/2000 | Flores, Jr. et al. | |
| 6,196,384 | B1 * | 3/2001 | Belden, Jr. | 206/308.1 |
| 6,243,356 | B1 * | 6/2001 | Rubino, III | 720/734 |
| 6,296,114 | B1 | 10/2001 | Bubb et al. | |
| 6,683,837 | B1 | 1/2004 | Kayl | |
| 6,789,668 | B2 | 9/2004 | Kuo | |
| 7,533,770 | B2 * | 5/2009 | Lan | 206/308.1 |
| 2003/0053896 | A1 | 3/2003 | Kern et al. | |
| 2003/0098251 | A1 | 5/2003 | Yang | |
| 2007/0205119 | A1 * | 9/2007 | Stewart et al. | 206/308.1 |
| 2007/0289886 | A1 * | 12/2007 | Cha | 206/308.1 |

FOREIGN PATENT DOCUMENTS

| | | |
|---|---|---|
| JP | 3406764 | 3/2003 |
| JP | 2006-216156 | 8/2006 |

OTHER PUBLICATIONS

International Search Report and Written Opinion issued in corresponding PCT/US2009/045346 on Dec. 30, 2009.

* cited by examiner

*Primary Examiner*—Jacob K Ackun, Jr.
(74) *Attorney, Agent, or Firm*—Procopio, Cory, Hargreaves & Savitch LLP

(57) ABSTRACT

A spindle packaging tray for holding a plurality of discs, the tray including: a depression designed to hold the plurality of discs, the depression including an inner wall that is at least partially ridged to provide stability for the plurality of discs to stay snug inside the depression; a spindle formed inside the depression, the spindle designed to help keep the plurality of discs in place; and a plurality of holes designed to allow consumers to easily insert or remove the plurality of discs to and from the depression. Keywords include spindle, ridged inner wall, and tray.

20 Claims, 5 Drawing Sheets

SPINDLE PACKAGING

CROSS-REFERENCE TO RELATED APPLICATIONS

This application claims the benefit of priority of U.S. Provisional Patent Application No. 61/056,345, filed May 27, 2008, entitled "Spindle Packaging." The disclosure of the above-referenced provisional application is incorporated herein by reference.

BACKGROUND

Conventional packaging of media discs such as DVDs include inserting each disc into a separate slimline or amaray case, and packaging the slimline cases in slipcase(s). FIG. 1, for example, shows conventional packaging of the discs in separate slimline cases or jackets 100 which are combined into a single slipcase 110. Another example, shown in FIG. 2, is an amaray case 200 holding multiple discs 210. For packaging, multiple amaray cases can be combined into a single slipcase.

SUMMARY

Implementations of the present invention include different aspects of spindle packaging of multiple compact discs (CDs), digital versatile/video discs (DVDs), and/or other similar types of media discs.

In one implementation, a spindle packaging tray for holding a plurality of discs is disclosed. The tray including: a depression designed to hold the plurality of discs, the depression including an inner wall that is at least partially ridged to provide stability for the plurality of discs to stay snug inside the depression; a spindle formed inside the depression, the spindle designed to help keep the plurality of discs in place; and a plurality of holes designed to allow consumers to easily insert or remove the plurality of discs to and from the depression.

In another implementation, a spindle packaging apparatus for holding discs is disclosed. The apparatus including: a depression configured to hold the discs; a ridged inner wall configured to provide ridges, wherein each ridge provides a snug space for one of the discs to slide in and stay in place without substantial movement; a spindle formed inside the depression, the spindle designed to help keep the discs in place; and at least one hole designed to allow easy removal of the discs from the depression.

In yet another implementation, a spindle packaging tray for holding a plurality of discs is disclosed. The tray including: a depression designed to hold the plurality of discs, the depression including an inner wall that is at least partially ridged to provide stability for the plurality of discs to stay snug inside the depression; a spindle formed inside the depression, the spindle designed to help keep the plurality of discs in place; a plurality of holes designed to allow consumers to easily insert or remove the plurality of discs to and from the depression; and a disc-shaped insert designed to fit snugly on top of the plurality of discs and into the depression.

DETAILED DESCRIPTION

Implementations of the present invention include different aspects of spindle packaging of multiple compact discs (CDs), digital versatile/video discs (DVDs), and/or other similar types of media discs.

In one aspect of the present invention, the spindle packaging is designed to reduce the overall carbon footprint with respect to the conventional packaging. For example, the spindle packaging is designed to reduce the number and amount of internal packaging of the media discs by allowing multiple media discs to be stacked directly into a single internal packaging.

In another aspect, the spindle packaging is designed to reduce the shelf space at retail stores which enables stores to put more products on store shelves. For example, spindle packaging allows multiple media discs to be stacked directly into a single internal packaging rather than having each media disc having its own internal packaging. This reduces the package volume of a particular set of media discs. This also reduces the overall packaging cost.

After reading this description it will become apparent how to implement the invention in various alternative implementations and alternative applications. However, although various implementations of the present invention will be described herein, it is understood that these implementations are presented by way of example only, and not limitation. As such, this detailed description of various alternative implementations should not be construed to limit the scope or breadth of the present invention.

Figure 1:
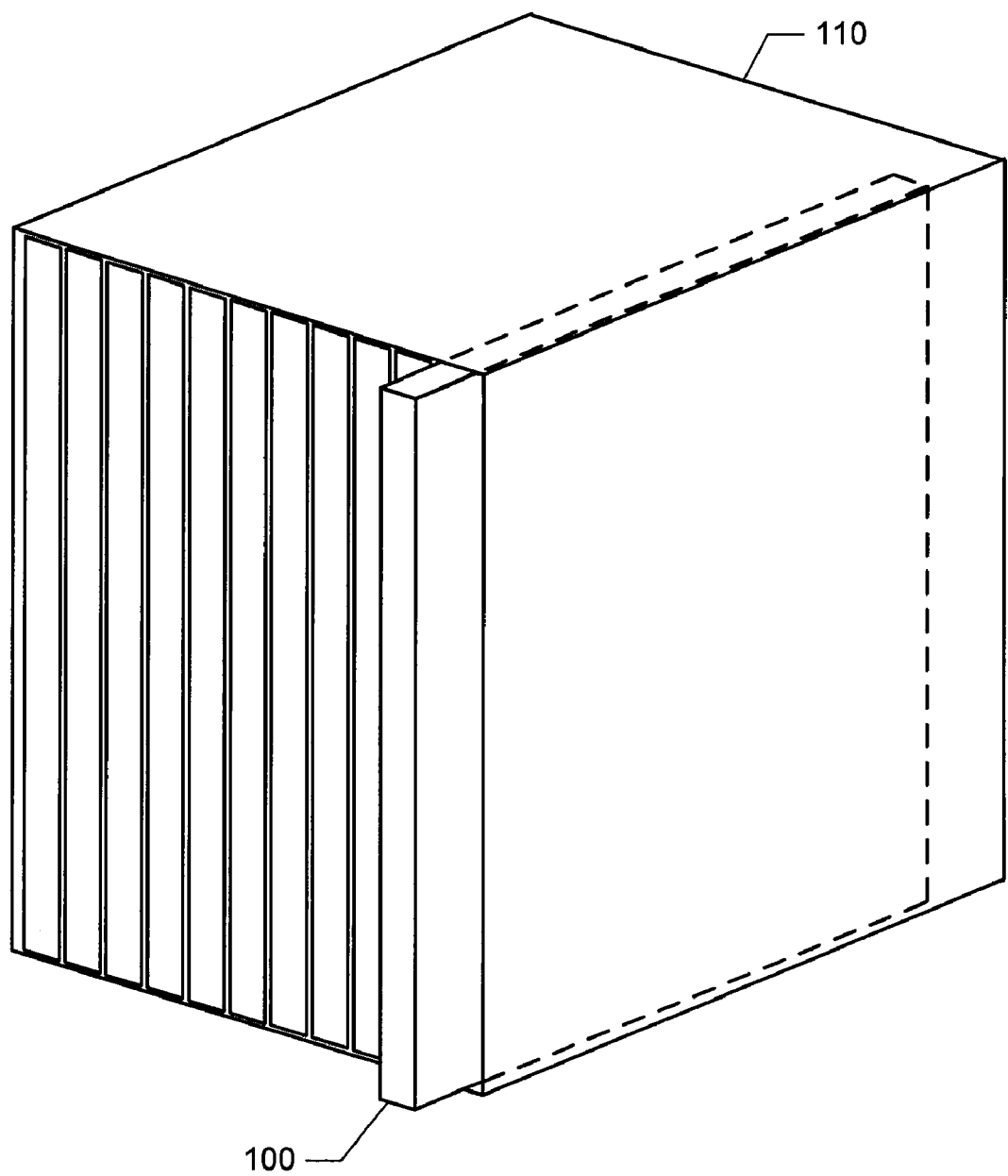
FIG. 1 shows a conventional packaging of discs in separate slimline cases which are combined into a single slipcase.
Figure 2:
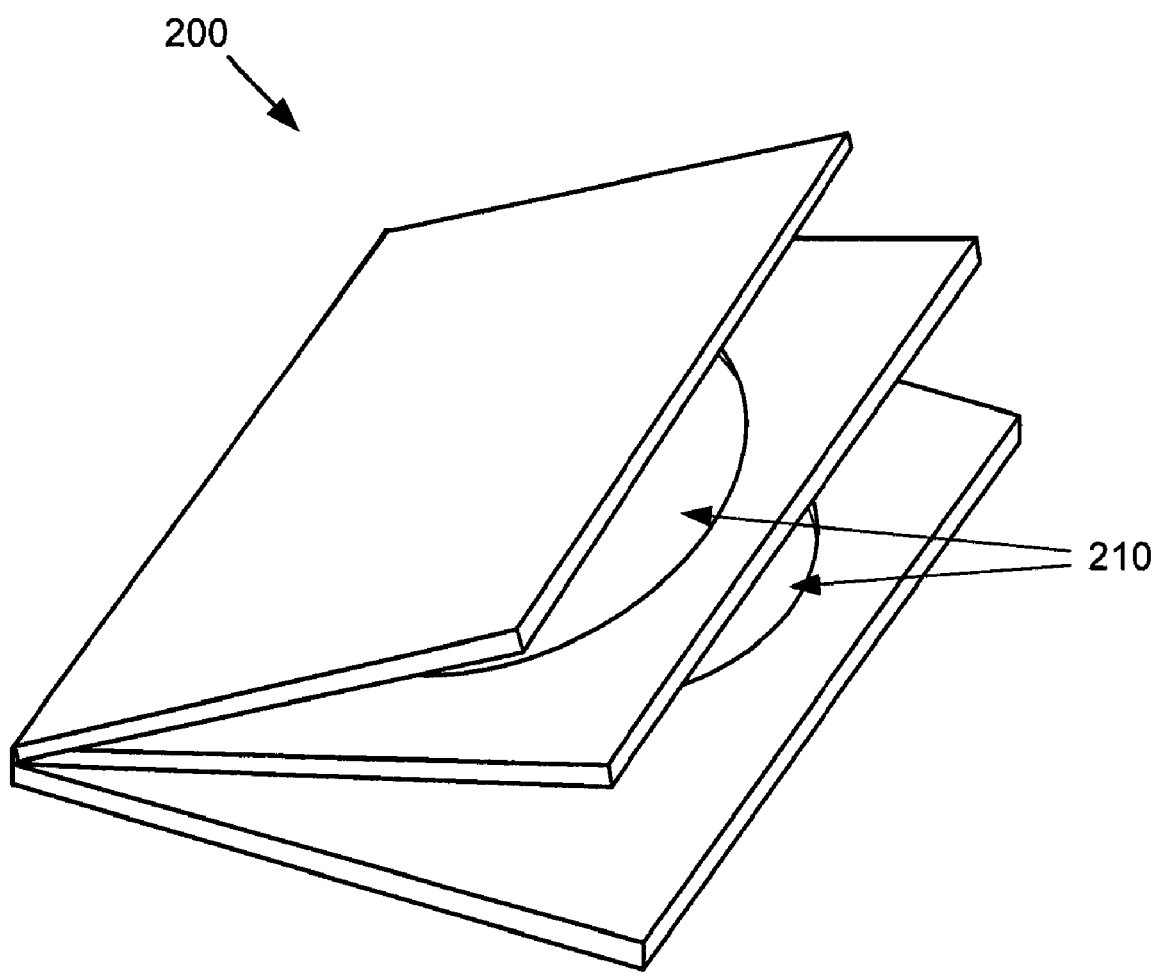
FIG. 2 shows another conventional packaging of discs where an amaray case holds multiple discs.
Figure 3:
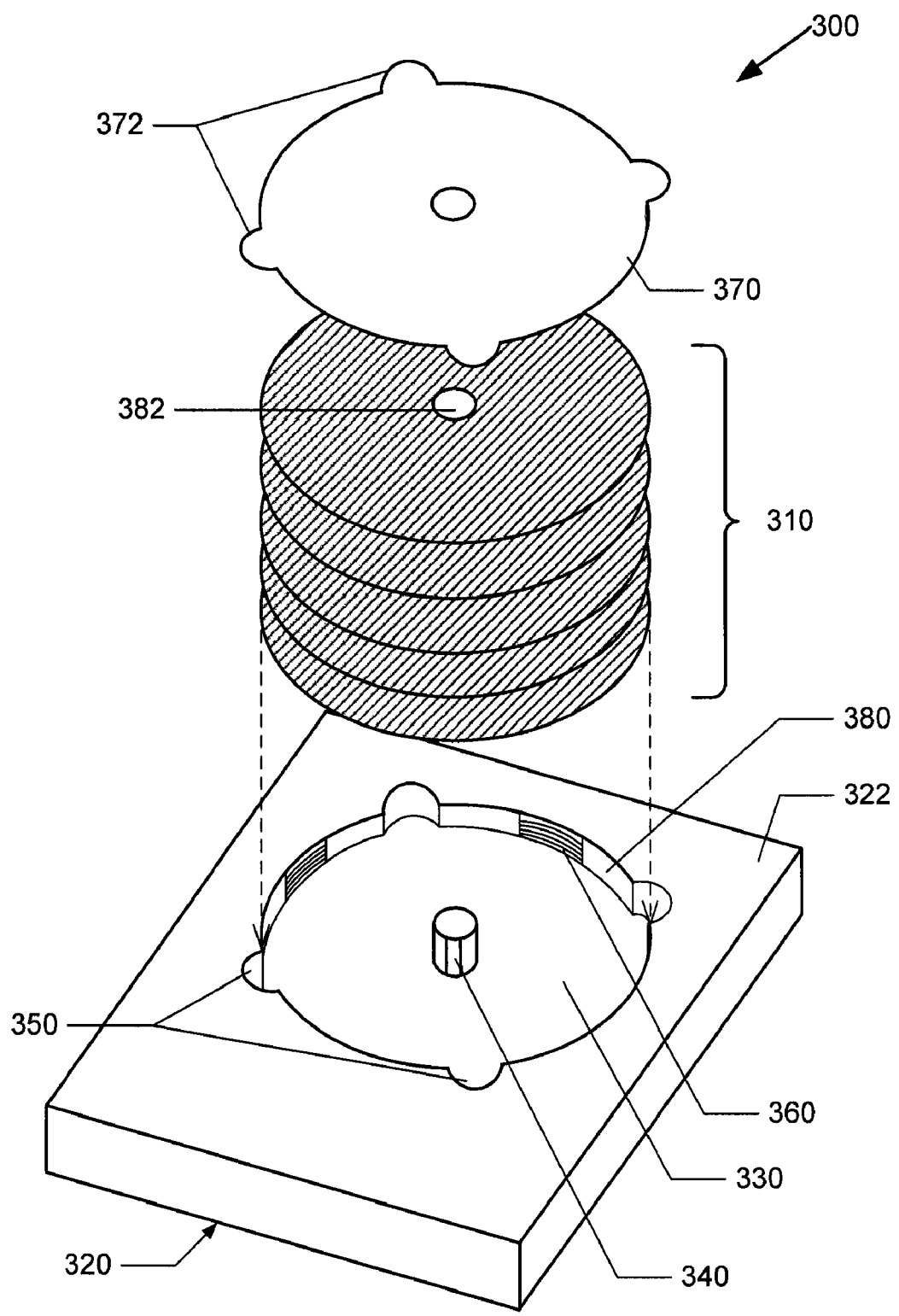
FIG. 3 shows one implementation of spindle packaging where multiple discs are stacked one on top of another, and inserted into a tray.

In one implementation of a spindle packaging 300 shown in FIG. 3, multiple discs 310 (with center holes 382) are stacked one on top of another, and inserted into a tray 320. The tray 320 can be formed using plastic or other suitable material, such as black styrene. The tray 320 can be formed into a shape that holds the stack of media discs 310, such as by being thermal-formed or injection molded. The tray can be of various opacity or color, depending on application, such as brown, black, or clear.

In the illustrated implementation of FIG. 3, the tray 320 includes a depression 330, a spindle 340, and a plurality of holes or recesses 350. The depression 330, which may typically be cylindrical in shape, is designed to hold circularly-shaped discs. The spindle 340, which is typically fixed, is designed to keep the discs in place. The shape and design of the spindle 340 can be varied according to the desired tightness with which the discs are to be held in the depression 330. For example, the spindle 340 can be designed in a screw shape with grooves. Further, the spindle 340 can be designed to be moveable with spring-like ridges to provide further grip. The plurality of holes 350 are designed to allow consumers to easily insert or remove the discs to and from the depression 330. Although the holes 350 are illustrated as circular, the holes 350 can be designed as any shape that allow consumers to easily insert or remove the discs to and from the depression 330.

In one implementation, the depression 330 also includes an inner wall 380 that is ridged. This ridged design 360 of the inner wall provides further stability for the multiple discs to stay snug inside the tray 320. Although FIG. 3 shows only part of the inner wall as being ridged, other implementations can be configured so that the entire inner wall is ridged.

The depth of the depression 330 is determined by the number of discs to be packaged. Thus, this depth can be set using injection molding to accommodate 5 discs, 10 discs, 20 discs, or any number of discs.

The spindle packaging 300 also includes a disc-shaped insert 370. In the illustrated implementation of FIG. 3, the insert 370 is designed to fit snugly on top of the discs and into the depression 330. The design of the insert 370 also includes a plurality of lips 372 with a shape that matches the shape of the holes 350 in the depression. The insert 370 is also designed to fit into the ridged design 360 of the inner wall. Typically, the insert 370 would fit into the top portion of the inner wall 380 with the ridged design 360 since the insert 370 sits on top of the stack of discs 310. The insert 370 can be formed with a corrugated cardboard of suitable thickness so that the top of the insert 370 is flush with the top surface 322 of the tray 320.

Figure 4:
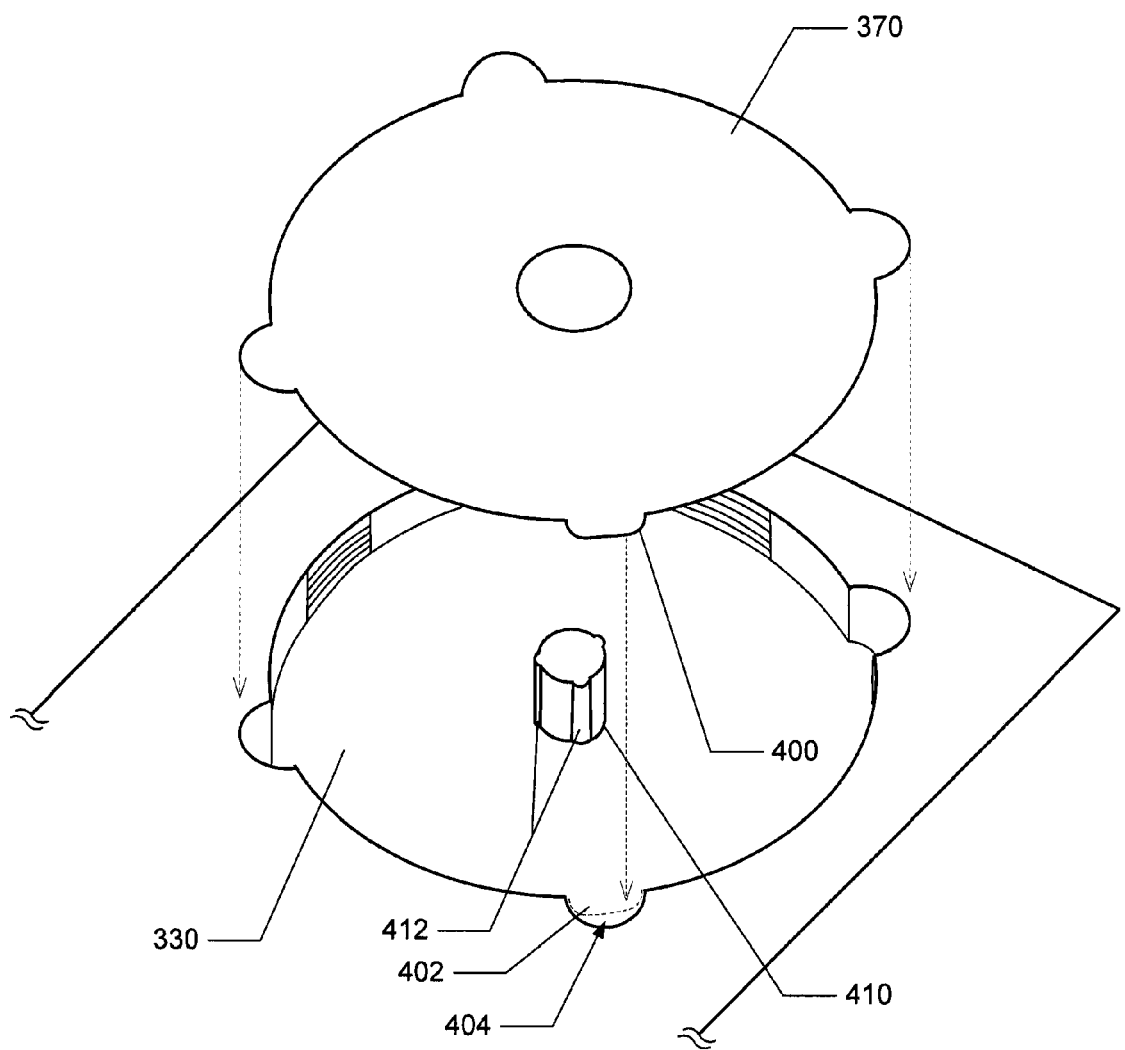
FIG. 4 shows another implementation of spindle packaging.

In another implementation shown in FIG. 4, at least one of the lips 400 of the insert 370 is designed to be smaller than the corresponding hole 402. This design allows the consumer to insert a finger or object into a gap 404 (formed by the end of the lip 400 and the edge of the corresponding hole 402) to easily lift the insert 370 out of the depression 330. Although FIG. 4 shows only one of the lips is designed to be smaller than the corresponding hole, the insert can be configured such that any number of lips can be designed to be smaller than the corresponding holes. In other implementations, the insert 370 is designed without any lips so that the insert 370 can be easily lifted out of the depression 330.

In the illustrated implementation of FIG. 4, the spindle 410 is also designed with ridges 412 so that it can provide additional tightness and security for the discs to stay in the tray. As described above, in some implementations, the ridges 412 of the spindle 410 are spring loaded to provide further grip on the center holes 382 of the discs 310.

Figure 5:
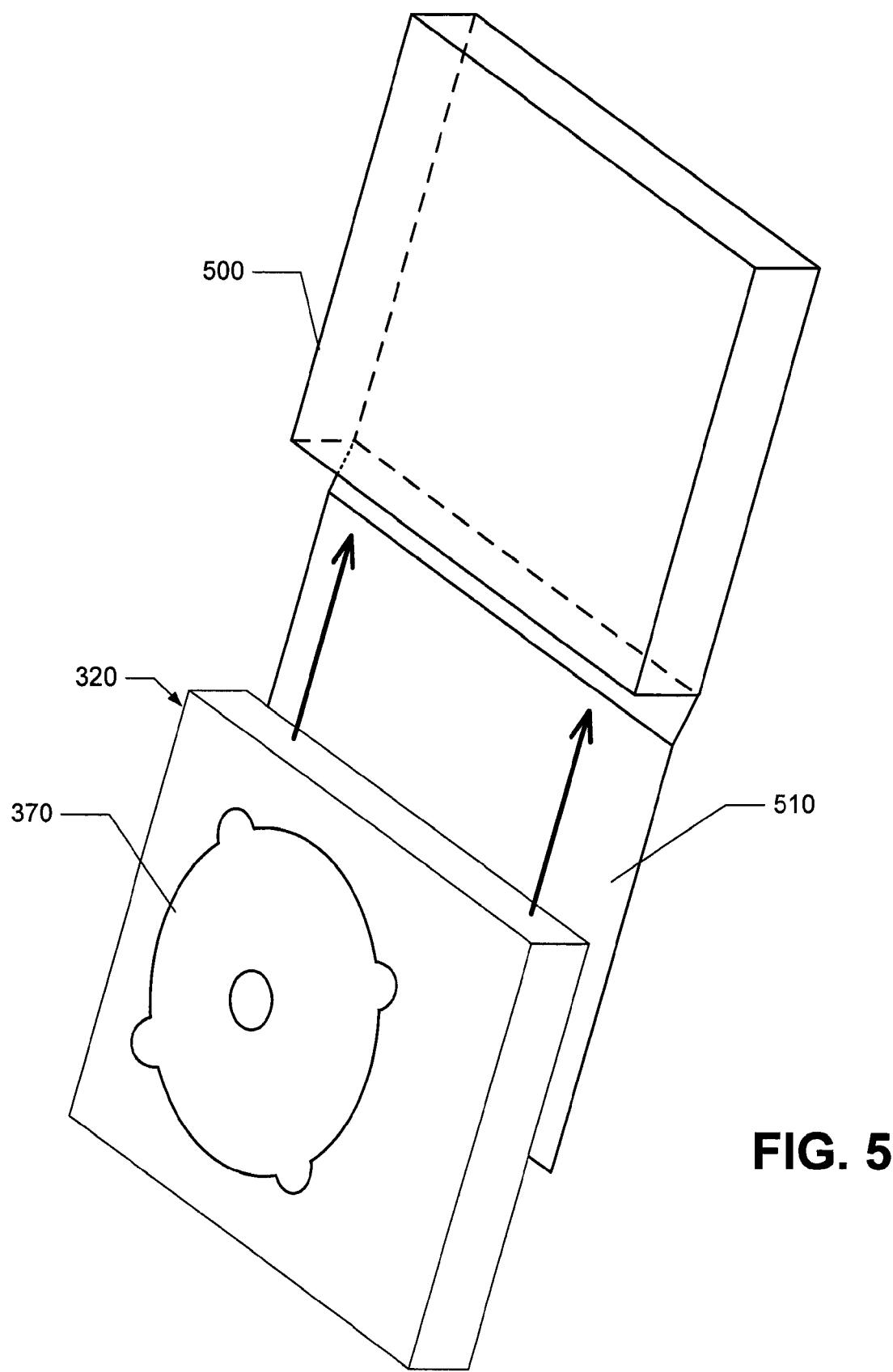
FIG. 5 shows another detailed implementation of spindle packaging.

As shown in FIG. 5, once the insert 370 is locked into position in the depression 330, the tray 320 (including the insert and the discs) can be shrunk-wrapped and placed into an outer carton 500. The outer carton 500 can be formed with bleached paper material to provide a solid cover for the discs, such as with solid bleached sulfate (SBS) board, or post-consumer waste/recyclable materials. Once the shrunk-wrapped tray 320 is inserted into the outer carton 500 and the cover 510 is closed, the outer carton itself can also be shrunk-wrapped.

In one implementation, the spindle packaging described above can be configured into two size options: Option A (smaller tray) to hold 1 to 5 discs; and Option B (larger tray) to hold 1 to 20 discs. The smaller tray can be used when selling five or less discs and the larger tray can be used when selling 6 to 20 discs.

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Thus, it is to be understood that the description presented herein represent implementations representative of the subject matter which is broadly contemplated by the present invention.

What is claimed is:

1. A spindle packaging tray for holding a plurality of discs, the tray comprising:
    a depression designed to hold the plurality of discs, the depression including an inner wall that is at least partially ridged to provide stability for the plurality of discs to stay snug inside the depression;
    a spindle formed inside the depression, the spindle designed to help keep the plurality of discs in place; and
    a plurality of holes designed to allow consumers to easily insert or remove the plurality of discs to and from the depression.

2. The tray of claim 1, wherein the tray is injection molded with plastic material.

3. The tray of claim 1, wherein the depression is cylindrical in shape.

4. The tray of claim 1, wherein a shape of the spindle is variable according to a desired tightness with which the plurality of discs is to be held in the depression.

5. The tray of claim 1, wherein the spindle is also designed in a screw shape with grooves.

6. The tray of claim 1, wherein the spindle is also designed to be moveable with spring-like ridges to provide a tight grip.

7. The tray of claim 1, wherein a depth of the depression is determined by a number of the discs to be packaged in the tray.

8. The tray of claim 1, further comprising
    a disc-shaped insert designed to fit snugly on top of the plurality of discs and into the depression.

9. The tray of claim 8, wherein the disc-shaped insert is formed with a corrugated cardboard of suitable thickness such that the top of the insert is flush with the top of the depression.

10. The tray of claim 8, wherein the disc-shaped insert further includes
    a plurality of lips having a shape that matches the shape of the corresponding plurality of holes.

11. The tray of claim 10, wherein the shape of at least one lip of the plurality of lips is designed to be smaller than the corresponding one hole of the plurality of holes.

12. The tray of claim 1, wherein the spindle is designed with ridges to provide additional tightness and security for the plurality of discs to stay in the depression.

13. The tray of claim 12, wherein the ridges of the spindle are spring loaded to provide further grip on the plurality of discs.

14. A spindle packaging apparatus for holding discs, the apparatus comprising:
    a depression configured to hold the discs;
    a ridged inner wall configured to provide ridges,
    wherein each ridge provides a snug space for one of the discs to slide in and stay in place without substantial movement;
    a spindle formed inside the depression, the spindle designed to help keep the discs in place; and
    at least one hole designed to allow easy removal of the discs from the depression.

15. The apparatus of claim 14, further comprising
    a disc-shaped insert designed to fit snugly on top of the discs and into the depression.

16. The apparatus of claim 15, wherein the disc-shaped insert further includes
    at least one lip having a shape that matches the shape of corresponding the at least one hole.

17. The apparatus of claim 16, wherein the shape of the at least one lip is designed to be smaller than corresponding the at least one hole.

18. The apparatus of claim 14, wherein the spindle includes ridges to provide additional tightness and security for the discs to stay in the depression.

19. A spindle packaging tray for holding a plurality of discs, the tray comprising:
- a depression designed to hold the plurality of discs, the depression including an inner wall that is at least partially ridged to provide stability for the plurality of discs to stay snug inside the depression;
- a spindle formed inside the depression, the spindle designed to help keep the plurality of discs in place;
- a plurality of holes designed to allow consumers to easily insert or remove the plurality of discs to and from the depression; and
- a disc-shaped insert designed to fit snugly on top of the plurality of discs and into the depression.

20. The tray of claim 19, wherein the disc-shaped insert further includes
- a plurality of lips having a shape that matches the shape of the corresponding plurality of holes.

* * * * *